(12) United States Patent
Este et al.

(10) Patent No.: US 11,078,018 B2
(45) Date of Patent: Aug. 3, 2021

(54) AUTOMATIC STORAGE AND DISTRIBUTION SYSTEM, AND HOUSING UNIT AND PICKING UNIT FOR PRODUCTS PACKAGED IN UNIT DOSES

(71) Applicant: SWISSLOG ITALIA S.P.A., Milan (IT)

(72) Inventors: Flavio Este, Selvazzano Dentro (IT); Lorenzo Spagna, Guastalla (IT); Gabriele Bianconi, Spezzano di Fiorano (IT)

(73) Assignee: SWISSLOG ITALIA S.P.A., Milan (IT)

( * ) Notice: Subject to any disclaimer, the term of this patent is extended or adjusted under 35 U.S.C. 154(b) by 336 days.

(21) Appl. No.: 15/573,612

(22) PCT Filed: May 26, 2016

(86) PCT No.: PCT/IB2016/053087
§ 371 (c)(1),
(2) Date: Nov. 13, 2017

(87) PCT Pub. No.: WO2016/193869
PCT Pub. Date: Dec. 8, 2016

(65) Prior Publication Data
US 2018/0122177 A1   May 3, 2018

(30) Foreign Application Priority Data

May 29, 2015 (IT) .......................... 102015000019411
Apr. 8, 2016 (IT) .......................... 102016000036451

(51) Int. Cl.
*B65G 1/137* (2006.01)
*G07F 11/16* (2006.01)
(Continued)

(52) U.S. Cl.
CPC ............ *B65G 1/137* (2013.01); *G07F 11/165* (2013.01); *G07F 11/62* (2013.01); *G07F 11/64* (2013.01); *G07F 17/0092* (2013.01)

(58) Field of Classification Search
CPC ........ G07F 11/64; G07F 11/165; G07F 11/62; G07F 17/0092; B65G 1/1378
See application file for complete search history.

(56) References Cited

U.S. PATENT DOCUMENTS 4,651,863 A * 3/1987 Reuter .................. B65G 1/133
                                            198/339.1
4,750,633 A * 6/1988 Schafer ................ B65G 1/0435
                                            206/599
(Continued)

FOREIGN PATENT DOCUMENTS

EP      0 439 355 A2    7/1991
EP      1 346 929 A1    9/2003
(Continued)

OTHER PUBLICATIONS

International Search Report issued in Application No. PCT/IB2016/053087 dated Aug. 31, 2016 (3 pages).
(Continued)

*Primary Examiner* — James Keenan
(74) *Attorney, Agent, or Firm* — Flynn Thiel, P.C.

(57) ABSTRACT

Storage and distribution system for products in unit doses, including plurality of housing units, each including a plurality of locations for products in unit doses. The housing units are organised on a vertical plane to produce at least one portion of a picking wall, in which the locations for products in unit doses face selective picking members. A picking unit includes picking members oriented on the picking wall for picking products packaged in unit doses. A collecting unit, arranged on a second side of the picking unit, includes a rack having a plurality of pegs facing towards the first side of the
(Continued)

picking unit. The pegs are reached by the picking members so as to pick therefrom or deposit thereon products packaged in unit doses. The plurality of pegs as a whole can collect a smaller number of unit dose products than those that can be stored in the automatic store.

18 Claims, 7 Drawing Sheets

(51) Int. Cl.
*G07F 11/62* (2006.01)
*G07F 11/64* (2006.01)
*G07F 17/00* (2006.01)

(56) References Cited

U.S. PATENT DOCUMENTS

| | | | |
|---|---|---|---|
| 5,468,110 A | 11/1995 | McDonald et al. | |
| 5,516,002 A * | 5/1996 | Morillo | G07F 11/64 221/150 HC |
| 5,880,443 A * | 3/1999 | McDonald | B65G 1/045 198/347.2 |
| 5,905,653 A * | 5/1999 | Higham | G07F 17/0092 312/215 |
| 7,651,310 B2 * | 1/2010 | Gambarelli | B65G 1/1376 414/403 |
| 8,219,243 B2 * | 7/2012 | Haas | B65G 1/1371 700/214 |
| 8,478,441 B2 * | 7/2013 | Liguori | G07F 11/165 700/232 |
| 8,644,982 B2 * | 2/2014 | Greyshock | B65D 75/327 700/216 |
| 8,849,445 B2 * | 9/2014 | Holmes | G07F 11/60 700/214 |
| 8,983,655 B2 * | 3/2015 | Braun | B65D 83/04 700/242 |
| 9,251,641 B2 * | 2/2016 | Kim | G07F 11/42 |
| 9,260,245 B2 * | 2/2016 | Este | B65G 1/1373 |
| 9,600,634 B2 * | 3/2017 | Bell | G07F 11/62 |
| 10,089,505 B1 * | 10/2018 | Huebner | H01Q 1/2216 |
| 2004/0037679 A1 * | 2/2004 | Sato | B65G 1/0435 414/281 |
| 2006/0161296 A1 | 7/2006 | Shoenfeld | |

FOREIGN PATENT DOCUMENTS

| | | |
|---|---|---|
| EP | 1 346 931 A1 | 9/2003 |
| WO | WO 2009/115985 A1 | 9/2009 |
| WO | WO 2014/207507 A1 | 12/2014 |

OTHER PUBLICATIONS

Written Opinion of International Searching Authority issued in Application No. PCT/IB2016/053087 dated Aug. 31, 2016 (6 pages).

* cited by examiner

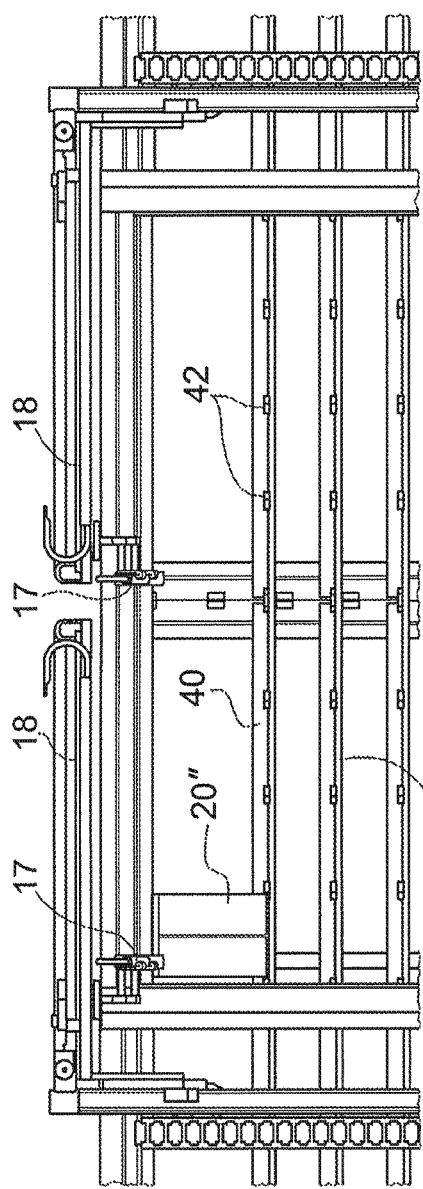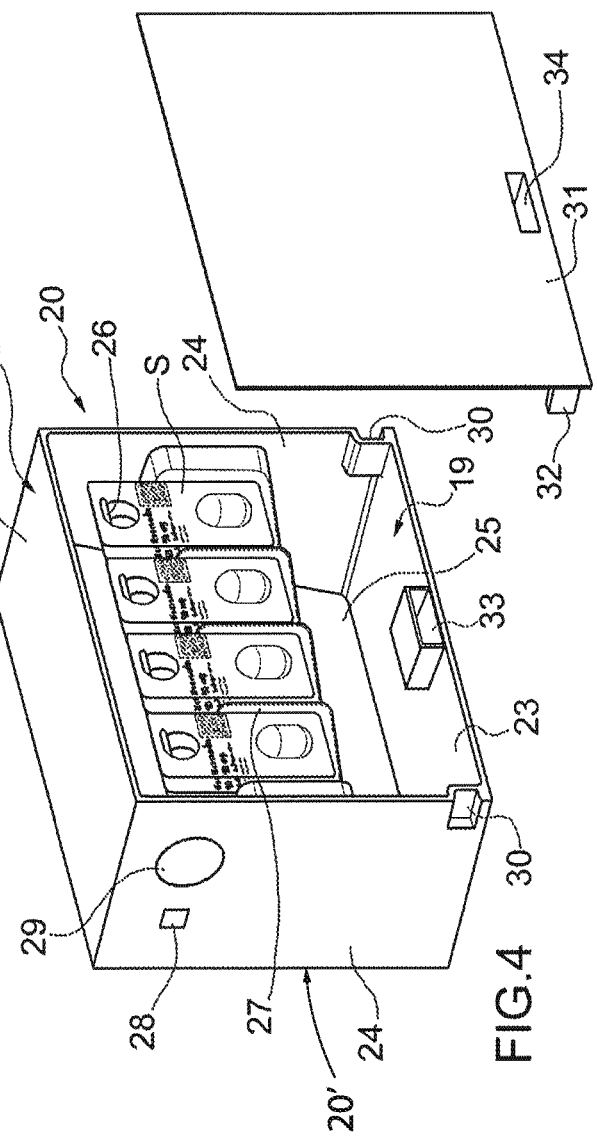
FIG.3
FIG.4

AUTOMATIC STORAGE AND DISTRIBUTION SYSTEM, AND HOUSING UNIT AND PICKING UNIT FOR PRODUCTS PACKAGED IN UNIT DOSES

FIELD OF THE INVENTION

The present invention relates to the sector of the storage and distribution of unit dose products. The invention was developed with particular regard, although not exclusively, to the storage and distribution of unit dose drugs.

TECHNOLOGICAL BACKGROUND

There are known automatic systems for the storage of unit dose drugs and the distribution thereof in groups determined in accordance with specific medical prescriptions. Storage systems for unit dose drugs are widespread in hospital pharmacies. Medical prescriptions for individual patients, to whom one or more drugs have to be administered daily or several times a day, arrive from the hospital departments. Hospital pharmacies make arrangements to recover the drugs requested from the store of unit dose drugs, and to distribute them to the various hospital departments, grouped together according to the specific medical prescriptions.

An automatic store of the above-mentioned type is described in EP 1346929 from the same applicant. The automatic store for unit dose drugs comprises a plurality of endless belts. Pegs are fixed to each endless belt, from which pegs small packets can be hung, each of which contains a unit dose of a corresponding drug or other product used in hospital departments, for example a syringe, gauze, an ampoule or bottle of normal saline, and so on. A picking system is arranged on one side of the automatic store for picking the packets of unit dose products that are presented progressively following a rotation of the belts. Picking devices of a known type generally comprise a grasping member, for example a pincer or suction member, that can be displaced on a vertical plane, for example along two Cartesian axes X-Y, so as to be successively positioned opposite the various unit dose products to be picked according to the various medical prescriptions. Each product picked in this way is sent to a system for preparing the specific medical prescriptions, by grouping together several unit dose products, for example by means of the system described in EP 1346931 from the same applicant.

Although the automatic store described in EP 1346929 provides satisfactory performance, there is an ever-greater demand in the sector for increasing performance in the storage and distribution of unit dose drugs, and particularly for increasing the storage density of unit doses. The applicant has developed a specific support for drug unit doses that allows greater storage density and lower cost per packet. This involves a card-shaped support, as described in WO 2014/207507, provided with a hole by which the support can be hung from a peg. This support is particularly compact and economical and makes it possible to increase the storage density of the unit dose drugs. There is, however, still a perceived need to have a store with a more compact configuration than that of known stores, which can receive these card-shaped supports for convenient and compact storage thereof. Preferably, such a store should be capable of also accommodating known types of packets, so as to allow them to be stored and managed separately or in combination with the card-shaped supports. Furthermore, greater storage density leads to an even more pressing need to accelerate the process of picking from the store of unit dose drugs, for faster and more efficient distribution thereof to the various hospital departments.

SUMMARY OF THE TECHNOLOGY

One object of the present technology is that of producing an automatic system for storing and distributing unit dose products that is compact and proves efficient and reliable. Another object of the technology is that of producing a unit for storing and distributing unit dose products that is simple to manage. Another object of the technology is that of producing an automatic system that makes it easy, fast and safe to pick unit dose products. Another object of the present technology is that of accelerating and optimising the process of picking and distributing products packaged in unit doses stored in an automatic store system. Another object of the technology is that of providing a unit for picking products packaged in unit doses that is compact, can be expanded in modules and proves efficient and reliable. Another object of the technology is that of producing a unit for picking products packaged in unit doses that can be used in combination with any store for drugs that are packaged in unit doses so as to be hung from pegs or similar supports. Another object of the technology is that of producing a unit for picking products packaged in unit doses that is simple to manage. Another object of the technology is that of producing an automatic system that makes it easy, fast and safe to pick and group together products packaged in unit doses. Another object of the technology is that of producing a collecting unit that can be added, even retrofitted, to a pre-existing picking unit in an automatic store for products packaged in unit doses.

In view of the above-mentioned objects, the technology described relates to an automatic storage and distribution system. The technology described also relates to a housing unit. The technology described also relates to a method for distributing unit dose products. The technology described also relates to a unit for picking products packaged in unit doses. The technology described also relates to a method for picking and distributing products packaged in unit doses.

According to a first aspect described, the storage and distribution system for products in unit doses comprises a plurality of housing units. Each of these units comprises a plurality of locations for products in unit doses. The housing units can be organised on a substantially vertical plane so as to produce at least one portion of a picking wall. The locations for products in unit doses on said picking wall face selective picking means. The dynamic implementation of such a picking wall, by organising the housing units, which can be placed, removed or substituted on the picking wall portion, makes it particularly flexible and fast to present unit dose products to the selective picking means.

According to a particular aspect, each housing unit comprises a box-shaped body having at least one front opening from which the unit dose products can be picked. The box-shaped bodies can be housed in at least one shelf so as to form the at least one portion of the picking wall. The use of box-shaped bodies makes it particularly simply to handle the housing units, and to house them on one or more shelves so as to form the at least one picking wall portion.

According to another particular aspect, the at least one shelf is open on two sides, one facing the selective picking means and the other communicating with a storage zone for the housing units. In this way, the housing units can be inserted into the shelves from the rear, into which the storage zone extends, without interfering with the selective picking means placed at the front of the shelves.

According to another particularly advantageous aspect, the at least one shelf comprises a plurality of bearing planes, on which the housing units are selectively placed so that the box-shaped bodies have their front opening facing the picking zone.

Advantageously, the distance between bearing planes substantially corresponds to the height of the box-shaped bodies of the housing units, so that these are inserted securely between one bearing plane and another. Advantageously, on each bearing plane, stop means are produced for the box-shaped bodies of the housing units. In this way, the housing units can be inserted into the shelves from the rear until they meet the stop means, preferably placed at the front of the bearing planes and locked in the most suitable position for picking the unit dose products. The stop means are releasable, for example of the snap-on type, so that with sufficient force the handling means of the housing units can unhook them from the stop means on the bearing planes so as to extract them from the shelves.

According to another aspect, a description is given of a housing unit particularly well suited for use in a storage and distribution system of the above-mentioned type. The housing unit comprises a box-shaped body having a front opening. Support elements are arranged in the box-shaped body for a plurality of supports for unit dose products. Advantageously, the support elements are pegs that project from a rear wall and face the front opening of the box-shaped body. According to a particular aspect, there is more than one peg for each housing unit. Said pegs are also tilted upwards and are aligned horizontally relative to each other. The pegs are arranged close to an upper wall of the box-shaped body (21) so that supports for unit dose products of different lengths can be hung therefrom.

According to another advantageous aspect, the housing unit comprises a selectively removable cover for closing the front opening of the box-shaped body, for example to prevent unit dose products from falling out in the case of external transport.

According to another aspect, a method is described for distributing unit dose products housed in a housing unit. By means of a storage and distribution system, there is provision for transporting one or more housing units and organising them on a substantially vertical plane so as to produce at least one portion of a picking wall. The locations for products in unit doses on the portion of picking wall face selective picking means. The method provides for asynchronously activating the selective picking means, so as to pick desired unit dose products from the housing units. The fact that the selective picking means are activated asynchronously from the transport of the housing units allows the distribution operations to be organised logistically so as to operate in picking mode substantially without interruption.

According to another aspect described, the unit for picking products packaged in unit doses comprises picking means that can be oriented towards a first side and an opposite, second side of the picking unit. When oriented towards the first side, the picking means are suitable, in use, for picking products packaged in unit doses from one face of an automatic store of the above-mentioned type and described below in one of its preferred but not restrictive embodiments. A collecting unit is arranged on the second side, opposite the first side relative to the picking means, of the picking unit. The collecting unit comprises a rack having a plurality of pegs facing towards the first side. The pegs of the rack can be reached by the picking means so as to pick therefrom or deposit thereon products packaged in unit doses. The pegs as a whole can collect a smaller number of unit dose products than those that can be stored in the automatic store. The collecting unit thereby acts as a temporary buffer for products before their final grouping together and delivery, or also as an auxiliary store for more widely consumed or more urgently used products, so as to optimise the picking times for these products and their automatic distribution.

According to a particular aspect, the rack comprises at least two distinct rack zones, in which the spacing between the various pegs is correspondingly different, so as to house at least two corresponding pack sizes for unit dose products. In this way, the requirements for storing products even with very different sizes from each other are reconciled with the requirements of maintaining a high degree of compactness and storage density of products on the collecting unit as well as in the automatic store.

According to a particular aspect, each peg on the rack is placed beside means for aligning the packs of unit dose products hanging from said pegs and separating them from the packs of unit dose products hanging from an adjacent peg. In this way, it is possible to accelerate the operations of picking products from and/or positioning them on the pegs of the rack, without having to worry about any oscillations in the packs of unit dose products that might interfere with the packs hanging from adjacent pegs.

According to a particular aspect, the collecting unit comprises a frame for supporting substantially vertical panels defining a base of the rack. The structure of the rack is thereby simplified. Furthermore, the base panels of the rack can be changed quickly for maintenance or for changing the configuration or number of pegs.

According to a particular feature, the collecting unit comprises supports for members for grouping together the products packaged in unit doses. In particular, shelves for supporting the grouping members can be fixed to the frame of the collecting unit. In this way, the rack of the collecting unit is placed close to the grouping members, making it faster to transfer the products from the first to the second grouping members, also because the picking member does not have to turn from side to side as when picking products from the automatic store to transfer them to the grouping members. It is therefore possible to preset on the rack of the collecting member, and pick well in advance from the automatic store those products that will be used together later in a single grouping, consequently saving time and making the grouping operations faster, it being possible to use the downtime in which no operation of grouping and distributing said products is required, for transferring products from the automatic store to the collecting unit.

According to another aspect, the collecting unit comprises means for selective coupling to a structure for supporting and handling the picking means. This makes the collecting unit an element that can optionally be combined with a handling assembly for the picking means, so that it can also be connected easily and securely to a pre-existing picking unit that does not have a collecting module.

According to another aspect, a method is described for picking and distributing products packaged in unit doses, using a picking unit of the above-mentioned type. According to this method, the picking means are controlled selectively when picking so as to perform one of the three following movements according to need:

a) from the first side to the second side, in order to collect at least one product packaged in a unit dose from an automatic store and to transfer it either to a predetermined peg of the rack or to a loading zone of a grouping member, or b) from a given position on the rack on the second side to another given position on the rack on the second side, in order to transfer a product packaged in a unit dose from one position to the other on the rack of the collecting unit, or c) from a given position on the rack on the second side to a predetermined zone on the second side corresponding to a loading zone of a grouping member.

BRIEF DESCRIPTION OF THE FIGURES

Further features and advantages will become apparent from the following detailed description of some preferred embodiments of the technology, given purely by way of non-restrictive example, with reference to the attached drawings, in which:

FIG. 3 is an enlarged view of the device for picking products from the automatic store in FIG. 1;

FIG. 4 is a perspective view of a storage unit according to the present technology, provided with an optional cover;

DETAILED DESCRIPTION

Figure 1:
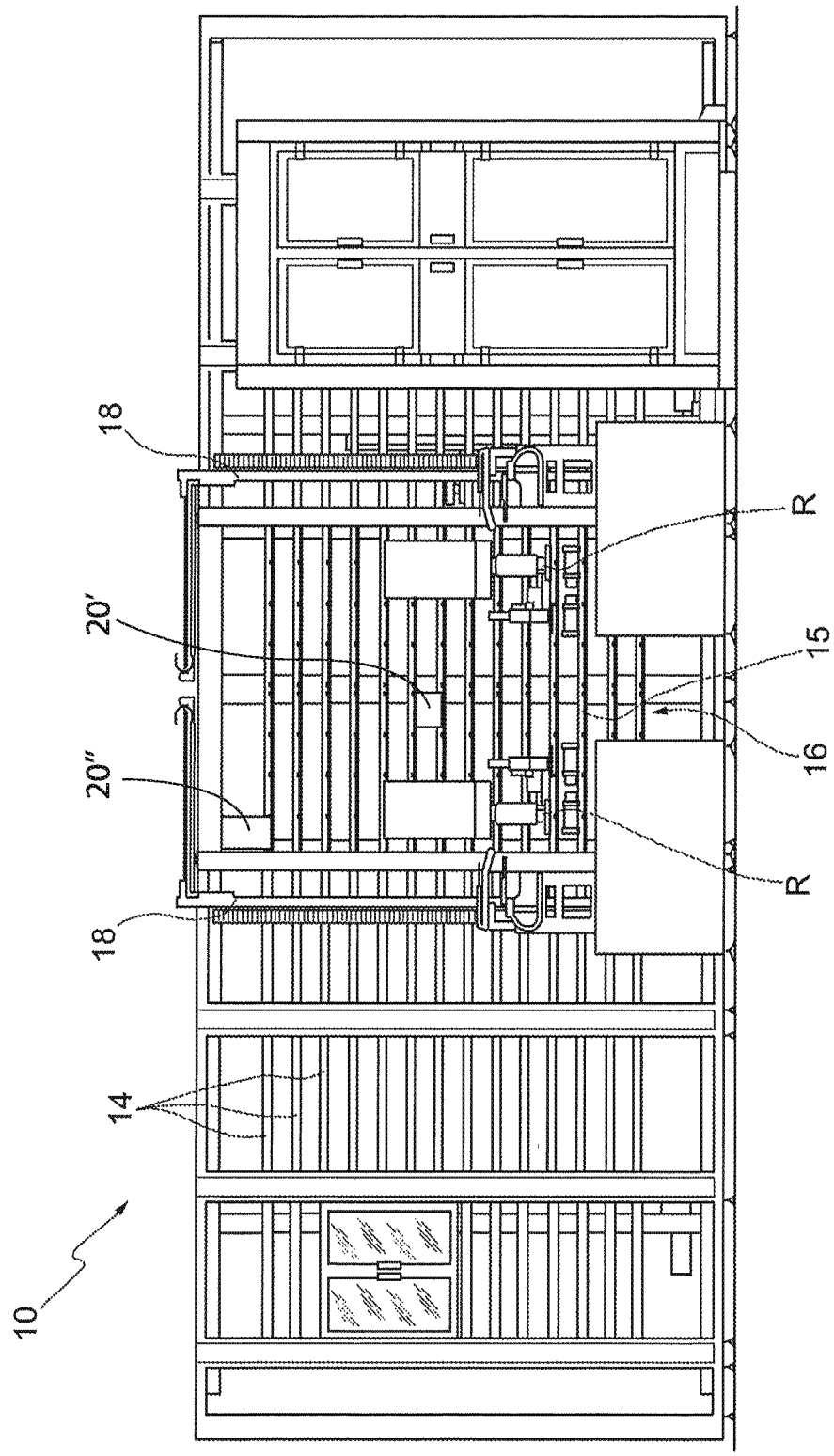
FIG. 1 is a diagrammatic elevation view of an automatic store according to the present technology.

With reference now to FIGS. 1 to 4, an automatic store 10 is intended for the storage of unit dose products. The unit dose products are preferably drugs or other related, medically prescribed products such as syringes, ampoules or bottles of normal saline, gauze, dressings, sterile compresses, and so on. The automatic store 10 is provided mainly, although not exclusively, for use with unit dose products supported by appropriate supports that can be hung from a peg.

The automatic store 10 is suitable for storing a plurality of housing units 20 that are more clearly visible in FIG. 4. Each housing unit 20 comprises a box-shaped body 21. The box-shaped body 21 is defined by an upper wall 22, a lower wall 23, two sides 24 and a rear wall 25, which overall define a front opening 19 in the box-shaped body 21. Inside the box-shaped body 21, some pegs 26 are provided, projecting out from the rear wall 25. From each peg 26, one or more supports S for unit dose products can be hung. Preferably, there is more than one peg for each housing unit 20, and even more preferably, there are three or four, as illustrated in FIG. 4. The pegs 26 are tilted upwards from the rear wall 25. The ends of the pegs 26 are aligned horizontally relative to each other.

Fundamentally, the pegs 26 are parallel to each other and lie on the same plane, slightly tilted relative to the horizontal. The pegs 26 are arranged close to the upper wall 22 of the box-shaped body 21. The pegs 26 are tilted upwards so that the supports S for the unit dose products hanging therefrom rest on each other and against the rear wall 25. The housing unit 20 can thus be transported without any risk of the products housed therein falling. Preferably, inside the box-shaped body 21 of the housing unit 20, separating partitions 27 are produced, keeping the supports S for the unit dose products aligned and preventing or reducing their oscillation during transport. The pegs 26 are the preferred support elements for the supports S of unit doses, but naturally supports having a different shape can be provided, such as rods, guide bars, combs, slots and the like, also depending on the shape of the supports S.

The size of the housing unit 20 is preferably standardised so that it can be managed interchangeably within the automatic store 10, as will be explained more clearly below. In particular cases, two or more types of housing units 20 can be provided, for example a first type of housing unit 20' for unit dose drugs, and a second type of housing unit 20" for more bulky products, for example syringes, dressings, gauze, bottles and the like.

Preferably, each housing unit 20 is identified by means of a barcode 28 and/or an RFID tag 29 placed on the box-shaped body 21. On the sides 24, gripping notches 30 are provided, in which the members for handling the box-shaped bodies 21 within the store 10 engage, for example the jaws of a handling robot or a stacker crane of a generally known type. Such handling members 13 are illustrated diagrammatically in FIG. 2. In an area at the front of the box-shaped body 21, preferably on the lower wall 23, there is a coupling or locking system, for example a slot 33 or other element for removably securing the box-shaped body 21 on a shelf, for storage or picking purposes, as described more clearly below.

The unit dose products are preferably transported in groups of products contained in the housing unit 20. Preferably but not restrictively, the unit dose products supported by the same peg 26 are products of the same type. The unit dose products supported by different pegs 26 inside the same housing unit 20 can be of the same type or different types. The housing unit is moved around inside the automatic store 10 while preferably keeping it in the vertical position illustrated in FIG. 4. As stated above, handling is done by means of a known type of handling apparatus or handling members 13, such as a stacker crane, a robot, a shuttle or similar means, provided with grasping means such as pincers or jaws or the like, capable of engaging in the gripping notches 30. Controlling the accelerations when handling the housing unit 20 prevents the unit dose products from coming off from the pegs 26 and out of the housing unit 20 itself. Where it is not possible to control the accelerations, or where it is wished to achieve very high speeds when transferring the housing units 20, or where it is necessary to transport the housing units 20 outside the automatic store 20, for example if they are to be loaded by an external system, it is possible to provide a cover 31 for closing off the box-shaped body 21. The cover 31 is preferably locked onto the box-shaped body 21, for example by means of teeth or pins 32 that engage in the gripping notches 30, and/or by means of a locking system 34 that interacts with the slot 33 made in the front part of the box-shaped body 21. The cover 31 allows the housing unit 20 to also be moved into positions other than the vertical position illustrated in FIG. 4, because the unit dose products are held on the pegs 26 by the cover 31, which in its closed position preferably touches the ends of the pegs 26.

Figure 2:
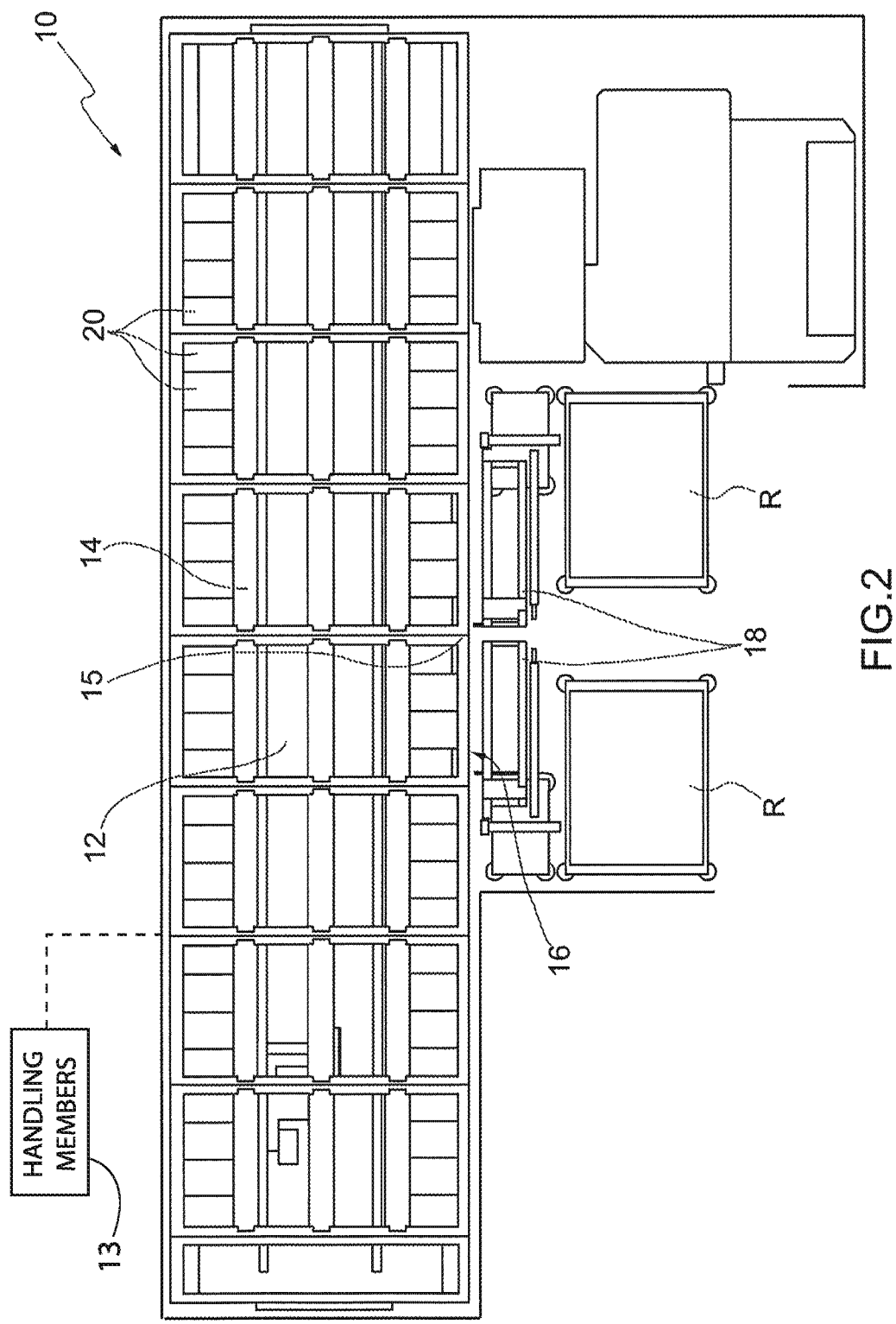
FIG. 2 is a diagrammatic plan view of the automatic store in FIG. 1.
Figure 5:
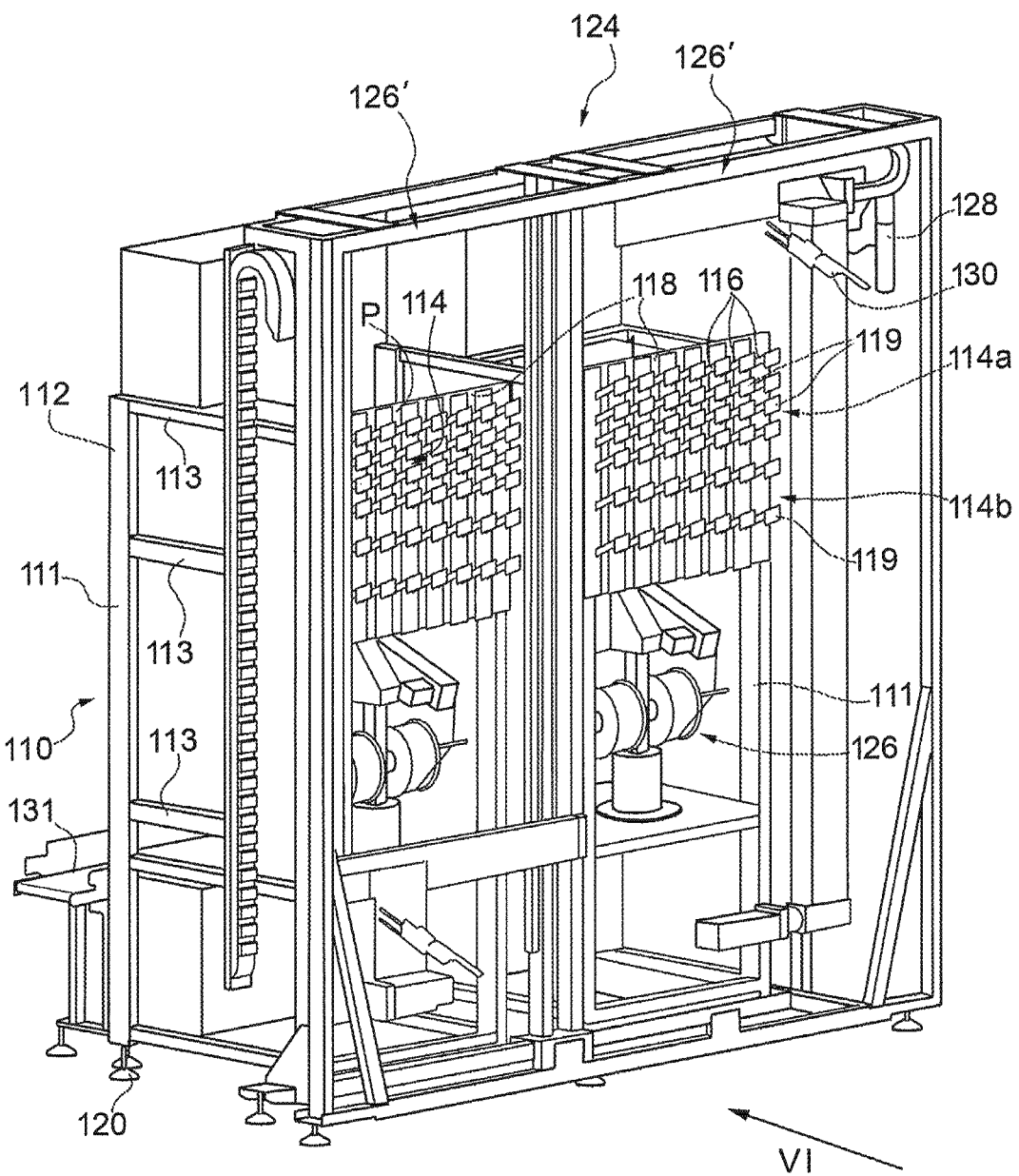
FIG. 5 is a diagrammatic perspective view of an example of a picking unit provided with a collecting unit according to the present technology, and not provided with the outer covering for clarity of illustration and shown from the side that, during use, faces towards the store of products packaged in unit doses as shown in FIG. 1.
Figure 6:
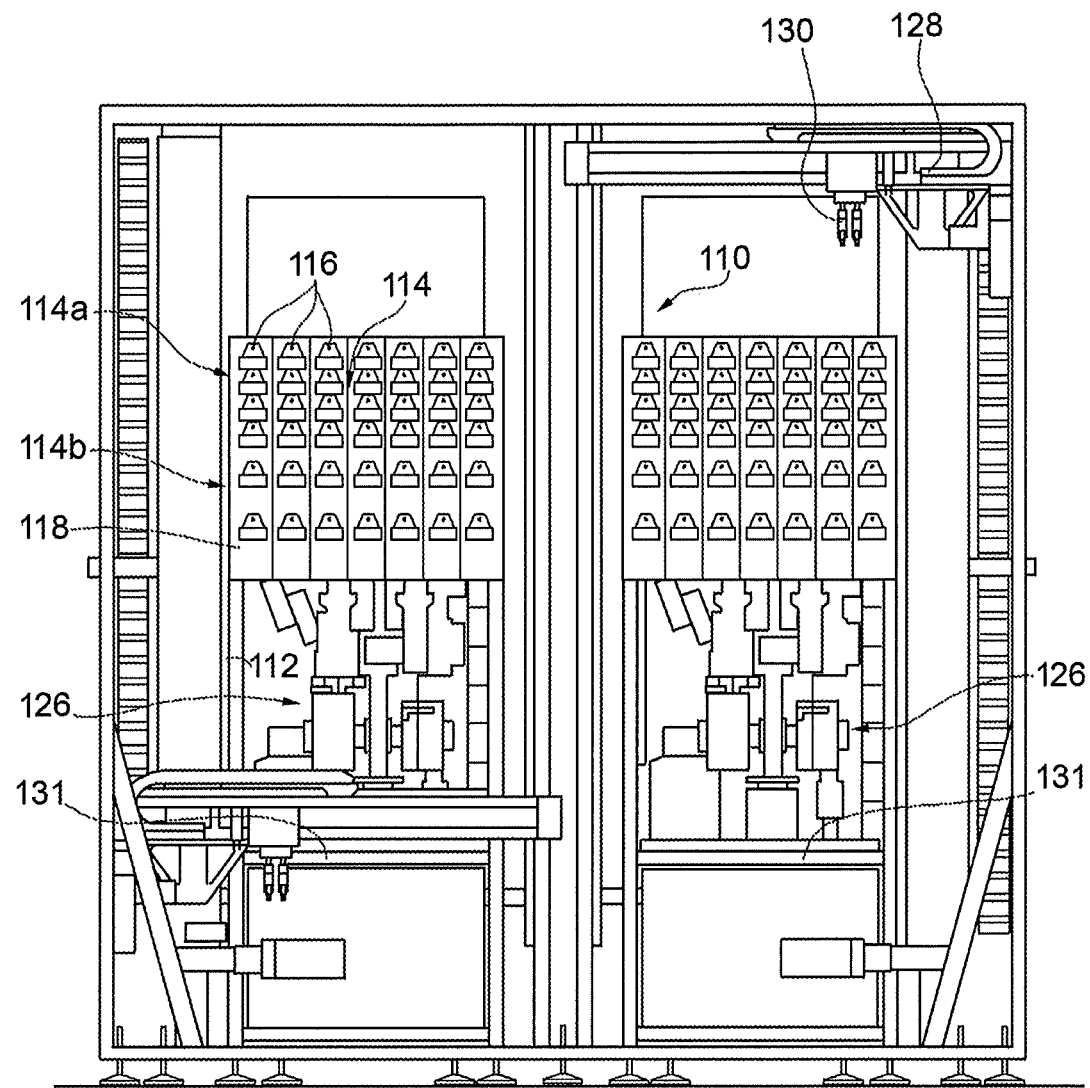
FIG. 6 is an elevation view in the direction of the arrow VI in FIG. 5.

With reference now to FIGS. 1 and 2, the automatic store comprises a storage zone 12 intended to receive a multiplicity of housing units 20. The housing units 20 are positioned so as to be removable on shelves 14, from which they can be picked or onto which they can be put by known handling members 13, such as stacker cranes, cradles, shuttles, manipulators, robots and other means generally known to experts in the sector, which will not be described more fully below.

The automatic store 10 also comprises a picking zone 16 from which it is possible to pick the desired unit dose products for the subsequent distribution thereof according to desired methods, for example by grouping them together according to specific medical prescriptions for a particular patient or for particular hospital departments. The picking zone 16 comprises one or more shelves 15 open on two sides, both towards the storage zone 12 and towards the outside of the automatic store 10. One or more picking members 18 and one or more grouping members R are arranged facing the picking zone 16. The latter can be of a generally known type, for example as described in EP 1346931 from the same applicant, and will not be described here in any greater detail.

As can be seen more clearly in FIG. 3, each shelf 15 of the picking zone 16 comprises a plurality of bearing planes 40, on which one or more housing units 20 can be put, thrust in from inside the automatic store. The distance between bearing planes 40 substantially corresponds to the height of the box-shaped bodies 21 of the housing units 20, so as to create custom-made housings for the box-shaped bodies 21 and to reduce the empty spaces on the shelf 15. FIG. 1, FIG. 3 and FIG. 4 show, by way of example, two types of housing units 20' and 20" having different heights, which can be inserted onto different shelf zones 15 depending on the distance between the bearing planes 40. On each bearing plane 40, in a position facing outwards, locators 42 are provided, with which the slots 33 of the box-shaped bodies 21 will be engaged. Fundamentally, the box-shaped bodies 21 can be placed on the planes 40 of the shelf 15 in predetermined positions, being thrust from behind by the store handling member 13, until the slots 33 hook onto the locators 42 so as to prevent them from coming away from the shelf 15. In this position, the pegs 16 face towards the outside of the automatic store 10, facing the picking members 18.

When a shelf 15 is full of housing units 20, from the outside this substantially constitutes a wall of pegs 16 from which suitable unit dose products can be picked, supported by the appropriate supports S. The automated picking system controls the maneuvering of the picking members 18, directing them towards specific positions on the vertical plane of the shelf 15. A grasping member 17 mounted on the picking member 18, for example a sucker, arranges for the support S related to the required unit dose product to be moved away from the corresponding peg 16, so that it can be moved towards the grouping member R or towards any other member that is provided downstream of the automatic store 10 for this purpose.

From a logistical point of view, the system of the present invention allows not only greater storage density but also a much higher picking and distribution speed for unit dose products than with the systems of the prior art. The management of the products is in fact subdivided into two subsystems: on the one hand, the housing units 20 are quickly moved away from and towards the picking zone 16 because this can be done by the handling members 13 or machines, such as stacker cranes, shuttles and similar means, that are very fast and efficient, particularly when handling standardised objects such as the box-shaped bodies 21. Moreover, the handling of the housing units 20 by the handling members 13 allows unit dose products of different types, housed in the same housing unit 20, to be quickly made available in the picking zone 16. The housing units 20 are also handled asynchronously, by the handling members 13, relative to the picking of the products by the picking members 18: the housing units 20 not involved in picking can be removed from the picking zone 16 and replaced by other housing units 20 picked from the storage zone 12 in the meantime. On the other hand, with good logistical planning when handling the housing units 20 according to the unit dose products housed in each of the housing units, the unit dose products presented on the shelves 15 can be picked almost continuously. The housing units 20 placed on the bearing planes 40 of the picking zone 16 are in fact replaced continuously, anticipating picking requests for particular unit dose products. The housing units 20 on the shelves 15 are replaced, while the picking members 18 are busy with picking unit dose products already located in the picking zone 16, from other housing units 20. Naturally, the picking speed increases as the capacity of the picking zone 16 increases, and in particular depending on the number of housing units 20 that can be placed simultaneously on the shelves 15.

The automatic store 10 can be configured modularly according to the specific needs of each individual installation. In particular, the number and arrangement of the shelves 15 can vary from what has been described and illustrated above by way of example. It is in fact possible to produce an installation comprising, for example, more than one picking zone 16, each with one or more shelves 15, so as to adapt to the size and shape of the premises and operating methods of the staff of a particular hospital pharmacy or similar.

With reference now to FIGS. 5 to 8, a collecting unit 110 for products packaged in unit doses comprises a frame 112 formed by uprights 111 and cross-pieces 113. In use, the frame 112 is covered by a protective casing, which is not illustrated in the figures for the sake of clarity. The frame 112 supports a rack 114 comprising a plurality of pegs 116 projecting out from a substantially vertical reference plane P. The reference plane P is preferably produced having one or more panels 118 side by side and fixed to the frame 112. The arrangement of the pegs 116 on the rack 114 preferably follows a pattern of rows and columns so that the position of each peg can easily be identified by a pair of whole values (A, B) corresponding to the corresponding row and column. Each pair of values is then associated with a precise pair of coordinates (X, Y) on the reference plane P corresponding to the actual position of each peg 116 relative to a predetermined reference origin. Preferably, but not restrictively, the rack 114 comprises two or more separate rack zones in which the reciprocal distance between the pegs is correspondingly different, so that each of the separate rack zones can house packs of unit dose products in various sizes as compactly as possible. In the example in the figures, the rack 114 is subdivided into two superimposed separate rack zones 114*a*, 114*b*, in which the upper rack zone 114*a* has pegs 116 closer together, to receive packs of unit dose products that are smaller than the broader packs that can be received in the lower rack zone 114*b*.

The frame 112 is preferably provided with height-adjustable support feet 120, by means of which it is possible to adapt the frame both to the shape of the floor and to the height of the other components of the automatic store system. The frame 112 is further provided with coupling members 122 that allow the frame 112 to be joined securely to a picking unit 124 for products packaged in unit doses. In this way, the collecting unit 110 of the present invention can easily be used as an optional or additional unit in a pre-existing automatic store. Preferably but not restrictively, the frame 112 also supports and houses one or more grouping members 126 intended to group together and label one or more unit dose products for subsequent distribution thereof, for example to various hospital departments, to fulfil medical prescriptions for patients. Each grouping member 126 is mounted on a support plane 127 fixed to the frame 112. The products grouped together by a grouping member 126 are dispatched on an outlet ramp 129 that directs them onto conveyor belts 131 for delivery to the final picking or further management destination.

Figure 7:
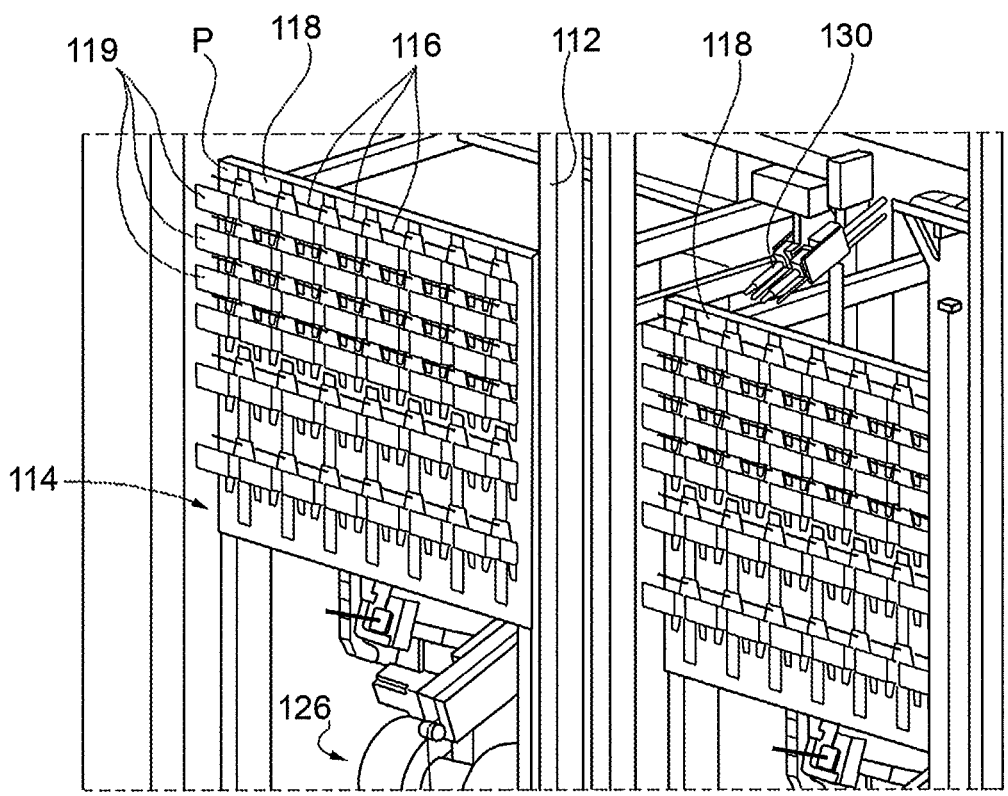
FIG. 7 is a perspective enlarged view of a detail of the collecting unit of FIGS. 5 and 6.
Figure 8:
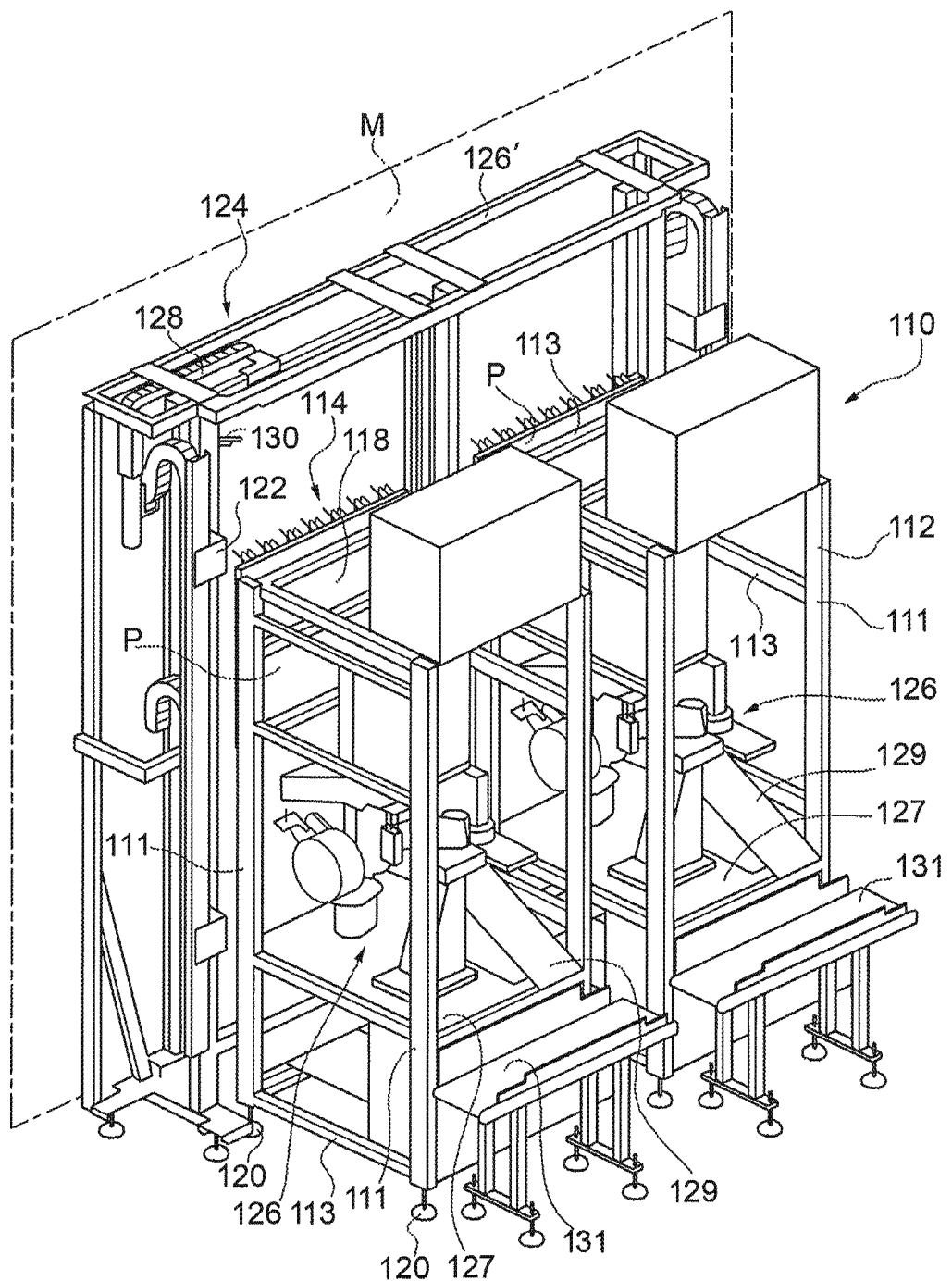
FIG. 8 is a diagrammatic perspective view of the collecting unit of FIGS. 5 to 7, shown from the side opposite that in FIG. 5, which, during use, faces towards the unloading of the groups of products packaged in unit doses.

As can be seen more clearly in the enlargement in FIG. 7 and also in FIG. 8, the pegs 116 are mounted on the panels 118 so that they project towards the picking unit 124, and therefore towards the product picking face of the automatic store M, indicated only diagrammatically with a broken line in FIG. 8. The automatic store M is connected in a known manner to the picking unit 124 for selectively picking products packaged in unit doses, which in this case is placed between the product picking face of the store M and the collecting unit 110.

The pegs 116 of the rack 114 are tilted slightly upwards, so that the products hanging therefrom bear against one another, and ultimately against the panels 118, by means of gravity. Naturally, each peg 116 can support one or more products packaged in unit doses, the packs of which are provided with holes, eyelets, hooks or similar elements, by which they can be hung from the pegs 116. On the sides of each peg 116, there are containing and separating tabs or partitions 119 projecting from the panels 118, allowing the packs of unit dose products hanging from each peg 116 to be held in a predefined position in order to prevent them from interfering with the packs hanging from an adjacent peg 116.

The automatic store M can be of the generally known type, for example from EP 1346929 from the same applicant, or of the type described above and shown in one of the preferred but not restrictive embodiments thereof in FIGS. 1 to 4. The picking unit 124 coupled to the automatic store M preferably comprises a frame 126' that supports a handling assembly 128 of a picking member 130 that can be displaced into a desired position, identified by coordinates X-Y, on a substantially vertical plane facing the store M that is substantially parallel to the plane P of the rack 114 of the collecting unit. The picking member 130 can alternatively turn towards the store M so as to pick a unit dose product and towards the collecting unit 110 in order to place the unit dose product on the rack 114 or to deliver it to one of the grouping members 126. The picking member 130 can also operate by facing solely towards the collecting unit 110 so as to pick a unit dose product from the rack 114 and deliver it to one of the grouping members 126. The picking member 130 can also be used for picking a unit dose product from a given position on the rack 114 or on the store M and transporting it to another given position on the rack 114 or on the store M, for the purposes of reorganising the unit dose products, for example to optimise their picking position on the basis of various kinds of criteria, for example relating to the rotational and usage speed of the products. From this point of view, the use of the collecting unit 110 is particularly beneficial for collecting mainly or even exclusively those products that are used continuously, a great deal or urgently in medical prescriptions, for example antibiotic or anti-inflammatory products, disinfectants, normal saline, syringes, dressings, gauze, etc.

The adoption of the collecting unit 110 makes it possible to optimise the operations of picking and distributing the products packaged in unit doses. The collecting unit can in fact act as a product collection buffer, on which various products picked from the store M can be positioned in turn while waiting to be grouped together by the grouping members 126. The operations of picking products from the store M can therefore occur at different times and not necessarily sequentially relative to the logistical organisation of grouping the products together by the grouping members 126 in order to make up and deliver the groups of products for a single medical prescription. This is particularly advantageous in order to best exploit the productive capacity of the grouping members 126, separating their feed flow from that of the picking of products from the store M. Moreover, picking products from the store M can advantageously exploit the downtime between one delivery and another, for example bringing forward the collection of products from the store M during the night, bringing forward the grouping of products for delivery the next day. Since the rack 114 of the collecting unit 110 is right next to the grouping members 126, and the products are all available on a single plane P that can be quickly accessed by the picking member 130, unit dose products can be supplied from the collecting unit 110 to the grouping members 126 much quicker than happens on average with direct picking from the store M, in which the products generally have to be transferred each time from locations inside the store to the front wall facing the picking unit 124.

Naturally, without prejudice to the principle of the invention, the embodiments and the implementation details can vary greatly while remaining within the scope of the present technology.

The invention claimed is:

1. A storage and distribution system for products in unit doses, said system comprising:
    a plurality of housing units, each said housing unit comprising a plurality of locations at which products in unit doses are stored;
    an automatic store having an interior configured for storing said housing units, said automatic store comprising a storage zone and shelves disposed within said storage zone, some of said housing units being removably positioned on said shelves in said storage zone, said automatic store further including a picking zone configured to organize and store others of said housing units such that same are oriented in a substantially vertical plane to form a picking wall in said picking zone;
    a picking apparatus, wherein locations of the respective said unit dose products of said housing units forming said picking wall face said picking apparatus, said picking apparatus being disposed and configured to remove at least one selected one of said unit dose products from its corresponding location on said picking wall; and
    a handling apparatus disposed and configured to place selected ones of said housing units on said shelves in said storage zone, said handling apparatus being disposed and configured to move a selected one of said housing units from said storage zone to said picking wall in said picking zone, to remove a selected one of said housing units from said picking wall in said picking zone, or to replace a selected one of said housing units on said picking wall in said picking zone with a different one of said housing units independently from removal of said at least one selected one of said unit dose products from said picking wall by said picking apparatus.

2. The storage and distribution system according to claim 1, wherein each said housing unit comprises a box-shaped body having an opening facing said picking apparatus, said picking apparatus removing said unit dose products from the respective said housing units through said openings thereof.

3. The storage and distribution system according to claim 2, wherein said shelves are storage zone shelves, said storage and distribution system further including picking zone shelves disposed within said picking zone, said housing units in said picking zone being removably supported on respective ones of said picking zone shelves, said picking zone shelves being disposed to support said housing units in said substantially vertical plane to form said picking wall.

4. The storage and distribution system according to claim 3, wherein each said picking zone shelf is open on first and second sides thereof, said first side facing said picking apparatus and said second side communicating with said storage zone.

5. The storage and distribution system according to claim 4, wherein each said picking zone shelf includes a plurality of bearing planes, said bearing planes supporting said housing units thereon such that said openings thereof face said picking apparatus.

6. The storage and distribution system according to claim 5, wherein a vertical distance between two vertically adjacent ones of said bearing planes corresponds to a height of said box-shaped bodies of the respective said housing units.

7. The storage and distribution system according to claim 6, wherein each said bearing plane comprises a locking arrangement configured to lock said box-shaped bodies of the respective said housing units in a picking position facing said picking apparatus.

8. The storage and distribution system according to claim 2, wherein said shelves are storage zone shelves, said storage and distribution system further including at least one picking zone shelf disposed within said picking zone, said housing units in said picking zone being removably supported on said at least one picking zone shelf in said substantially vertical plane to form said picking wall.

9. The storage and distribution system according to claim 8, wherein said at least one picking zone shelf is open on first and second sides thereof, said first side facing said picking apparatus and being accessible by said picking apparatus and said second side being accessible by said handling apparatus.

10. The storage and distribution system according to claim 9, wherein said at least one picking zone shelf includes a plurality of bearing planes, each said bearing plane supporting one of said housing units thereon such that said opening thereof faces said picking apparatus.

11. The storage and distribution system according to claim 10, wherein each said bearing plane comprises a locking arrangement configured to lock said box-shaped bodies of the respective said housing units in a picking position facing said picking apparatus.

12. The storage and distribution system according to claim 1, wherein each said housing unit comprises a box-shaped body having a front opening, a plurality of support elements configured to support said unit dose products disposed within said housing unit, and a coupling or locking system configured for removably securing said box-shaped body on one of said shelves disposed within said storage zone or on a shelf disposed within said picking zone.

13. The storage and distribution system according to claim 12, wherein each said box-shaped body has a rear wall and each said support element comprises a peg projecting from said rear wall and facing said front opening.

14. The storage and distribution system according to claim 13, wherein each said box-shaped body has an upper wall, said pegs being disposed closely adjacent to said upper wall and tilting upwardly towards said upper wall, and said pegs are substantially horizontally aligned with one another.

15. The storage and distribution system according to claim 14, wherein each said box-shaped body has a selectively removable cover disposed to close off said front opening.

16. The storage and distribution system according to claim 1, wherein said shelves are storage zone shelves, said storage and distribution system further including picking zone shelves disposed within said picking zone, said housing units in said picking zone being removably supported on respective ones of said picking zone shelves, said picking zone shelves being disposed to support said housing units in said substantially vertical plane to form said picking wall, each said picking zone shelf being accessible from said storage zone by said handling apparatus at a location different from said locations on said picking wall from which said picking apparatus removes said at least one selected one of said unit dose products.

17. A method for distributing unit dose products used in said storage and distribution system according to claim 1, said method comprising the steps of:
    placing selected ones of said housing units on said shelves in said storage zone with said handling apparatus;
    removing at least one selected one of said unit dose products from its corresponding location on said picking wall with said picking apparatus; and
    with said handling apparatus, moving a selected one of said housing units from said storage zone to said picking wall in said picking zone, removing a selected one of said housing units from said picking wall in said picking zone, or replacing a selected one of said housing units on said picking wall in said picking zone with a different one of said housing units independently from said step of removing said at least one selected one of said unit dose products from said picking wall with said picking apparatus.

18. A storage and distribution system for products in unit doses, said system comprising:
    a plurality of housing units, each said housing unit comprising a plurality of locations at which products in unit doses are stored;
    an automatic store having an interior configured for storing said housing units, said automatic store comprising a storage zone and shelves disposed within said storage zone, some of said housing units being removably positioned on said shelves in said storage zone, said automatic store further including a picking zone and shelves disposed within said picking zone, said shelves in said picking zone being configured to organize and store others of said housing units such that same are oriented in a substantially vertical plane to form a picking wall at said picking zone;
    a picking apparatus, wherein locations of the respective said unit dose products of said housing units forming said picking wall at said picking zone face said picking apparatus, said picking apparatus being disposed and configured to remove at least one selected one of said unit dose products from its corresponding location on said picking wall; and a handling apparatus disposed and configured to place selected ones of said housing units on said shelves in said storage zone, said shelves in said picking zone being accessible from said storage zone by said handling apparatus to permit said handling apparatus to move a selected one of said housing units from said storage zone to a position on said picking wall in said picking zone, to remove a selected one of said housing units from said picking wall in said picking zone, or to replace a selected one of said housing units on said picking wall in said picking zone with a different one of said housing units, each said picking zone shelf being accessible by said handling apparatus at a location different from said locations on said picking wall from which said picking apparatus removes said at least one selected one of said unit dose products.

\* \* \* \* \*